United States Patent [19]

Giffin, III et al.

[11] Patent Number: 4,817,378
[45] Date of Patent: Apr. 4, 1989

[54] GAS TURBINE ENGINE WITH AUGMENTOR AND VARIABLE AREA BYPASS INJECTOR

[75] Inventors: Rollin G. Giffin, III, Cincinnati; Ivan E. Woltmann, West Chester; Donald P. McHugh, Wyoming, all of Ohio

[73] Assignee: General Electric Company, Cincinnati, Ohio

[21] Appl. No.: 198,670

[22] Filed: May 23, 1988

Related U.S. Application Data

[63] Continuation of Ser. No. 14,562, Feb. 13, 1987, abandoned.

[51] Int. Cl.⁴ ................................................. F02K 3/10
[52] U.S. Cl. .......................................... 60/261; 60/262
[58] Field of Search ...................... 60/261, 226.3, 262, 60/263, 749, 226.1

[56] References Cited

U.S. PATENT DOCUMENTS

| | | | |
|---|---|---|---|
| 3,043,101 | 7/1962 | Lefebvre et al. | 60/261 |
| 3,060,680 | 10/1962 | Wilde et al. | 60/226.3 |
| 3,100,627 | 8/1963 | Wilde . | |
| 3,330,117 | 7/1967 | Coplin et al. | 60/261 |
| 3,595,024 | 7/1971 | Kohler | 60/262 |
| 3,698,186 | 10/1972 | Beane et al. | 60/261 |
| 3,701,255 | 10/1972 | Markowski | 60/261 |
| 3,750,402 | 8/1973 | Vdoviak et al. | 60/261 |
| 3,800,530 | 4/1974 | Nash | 60/261 |
| 3,938,325 | 2/1976 | Bergt | 60/261 |
| 4,072,008 | 2/1978 | Kenworthy et al. | 60/261 |
| 4,335,573 | 6/1982 | Wright | 60/261 |
| 4,461,146 | 7/1984 | DuBell | 60/261 |

Primary Examiner—Donald E. Stout
Attorney, Agent, or Firm—Steven J. Rosen; Derek P. Lawrence

[57] ABSTRACT

A plurality of circumferentially displaced hollow members are positioned between an outer bypass duct and the center body of the core engine. Each of the hollow members is open at the radially outward end thereof for receiving relatively cool gas from the bypass duct. Each hollow member is formed with an opening in the side thereof extending substantially the full length of the hollow member near the trailing edge thereof for discharging bypass gas from the bypass duct in a direction facilitating thorough mixing of the bypass gas and core gases. A pivoted vane is provided in this opening of each of the hollow members and these vanes are controlled to vary the airflow through the aforementioned openings. Radially extending spraybars or fuel rods are provided within each hollow member adjacent opposite sides thereof so as to be cooled by the bypass air flowing through the hollow member. The spraybars are provided with a plurality of openings adjacent the sidewalls of the hollow members and corresponding openings are provided in these walls so that fuel, during augmentor operation, is directed into the area between adjacent hollow members. The aft end of each hollow member is formed as a relatively wide flat surface which acts as a flameholder for the fuel supplied from the spraybars and burned in the augmentor. The forward end of each hollow member is curved to an angle corresponding generally to the swirl angle of core gases exhausted from the core engine so as to effect a deswirling of this gas.

15 Claims, 3 Drawing Sheets

GAS TURBINE ENGINE WITH AUGMENTOR AND VARIABLE AREA BYPASS INJECTOR

This is a continuation, of application Ser. No. 014,562, filed Feb. 13, 1987, now abandoned.

BACKGROUND OF THE INVENTION

This invention relates to gas turbine engines used for powering aircraft, and more particularly for such engines employed for aircraft intended to operate at speeds ranging from subsonic to supersonic.

Engines having the ability to operate effectively over a range of speed from subsonic to supersonic may include an augmentor or afterburner for providing thrust augmentation for take-off, some maneuvers and for supersonic acceleration. Such engines further may include a variable area bypass injector that provides improved engine performance.

Optimum operation of such engines over the wide range of conditions occurring from subsonic speed to supersonic speed requires satisfying demanding criteria. For example, it is desirable, particularly during dry or non-augmented operation, that the core gases and the bypass gases by mixed as uniformly as possible before discharge from the exhaust nozzle of the engine. It is also desirable to hold the engine airflow, which is affected by the fan employed in such engines, by the speed of the aircraft, and by the engine thrust requirement, in order to operate at an optimum point on the performance map of the aircraft. It is necessary that a satisfactory flameholder be provided to maintain the flame supplying heat to the augmentor, despite the high speed of airflow through the fuel-burning area. Further, it is desirable that the spraybars or fuel tubes providing fuel for the augmentor not be subjected to too high a temperature because under such conditions the fuel may decompose and the resultant deposits may plug holes, which may be as small as 0.020-0.040 inch, in the fuel delivery system. The engine of the subject invention is designed to meet all of these demanding criteria with resultant optimization of the performance of the aircraft.

Prior art engines have included augmentors, provision for mixing core gases and bypass gas, and have provided flameholders for the fuel burning elements. However, no prior art of which the applicants are aware has incorporated in a single structure, as in the subject invention, provision for supplying fuel, for flameholding, for cooling the spraybars through which the fuel is supplied, for actively controlling, or modulating the area through which bypass gases are injected into the core gases being exhausted from the core engine, and for effecting a thorough and complete mixing of the core gases and bypass gases before discharge through the exhaust nozzle of the engine.

Accordingly, it is an object of this invention to provide, in a single combined structure, means for effecting thorough mixing of bypass gas and core gases over substantially the entire area of the exhaust passage of the engine, for incorporating in the structure fuel rods or spraybars and flameholders for the fuel being burned, for efficiently cooling the walls of the structure and components therein, including spraybars, support members, etc, for deswirling the core gases discharged from the core engine and for controlling the injection of bypass gas into the core gases.

SUMMARY OF THE INVENTION

In carrying out the invention, in one form thereof, a plurality of circumferentially displaced hollow members are positioned between an outer bypass duct and the center body of the core engine, that is extending radially across the area through which the core gases from the core engine are exhausted. Each of the hollow members is open at the radially outward end thereof for receiving relatively cool gas from the bypass duct and may be closed at the radially inward end at the center body. Alternatively, some openings could be provided at the radially inward end to provide some flow of air into the center body region. Each hollow member is formed with an opening in a side wall thereof near the trailing edge extending substantially the full length of the hollow member for discharging bypass gas from the bypass duct in a direction facilitating thorough mixing of the core gases and the bypass gas. A pivoted vane is provided in this opening of each of the hollow members and these vanes are controlled to modulate the airflow through the aforementioned openings. Radially extending spraybars or fuel rods are provided within each hollow member adjacent opposite sides thereof so as to be cooled by the bypass gas flowing through the hollow member. The spraybars are provided with a plurality of openings adjacent the sidewalls of the hollow members and corresponding openings are provided in these walls so that fuel, during augmentor operation, is directed into the area between adjacent hollow members. The aft end of each hollow member is formed as a relatively wide, substantially flat surface which acts as a flameholder for the fuel supplied from the spraybars and burned in the augmentor. The forward end of each hollow member is curved to an angle corresponding generally to the swirl angle of core gases exhausted from the core engine so as to effect a deswirling of this gas.

BRIEF DESCRIPTION OF THE DRAWINGS

The invention may be better understood by reference to the drawings in which.

DESCRIPTION OF THE PREFERRED EMBODIMENT

Figure 1:
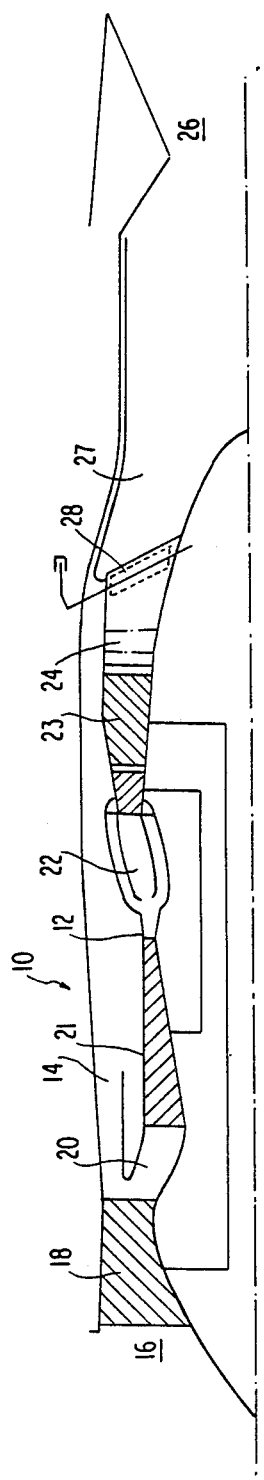
FIG. 1 is a schematic cross-section view, with parts omitted, showing the general arrangement of a gas turbine engine incorporating this invention.

Referring first to FIG. 1, there is shown the general outline of a gas turbine engine 10 which includes a core engine shown generally at 12 and a bypass duct 14 surrounding the core engine. Gas, normally air, is supplied through an inlet 16 to a fan shown generally at 18. A portion of this air is directed to the core engine through a passage 20, is compressed in a compressor 21, supplied to a combustor 22 for burning fuel therein, and the resulting hot gases are directed to a turbine 23 for powering the engine and the core gases are exhausted through a passage 24. The other portion of the inlet gas is directed through the bypass duct or passage 14, subsequently mixed, at least in part, with the core gases and the mixed bypass and core gases are discharged through the exhaust nozzle 26 of the engine to provide thrust. An augmentor or afterburner 27 is provided for supplying additional heat to the exhaust gases.

Figure 2:
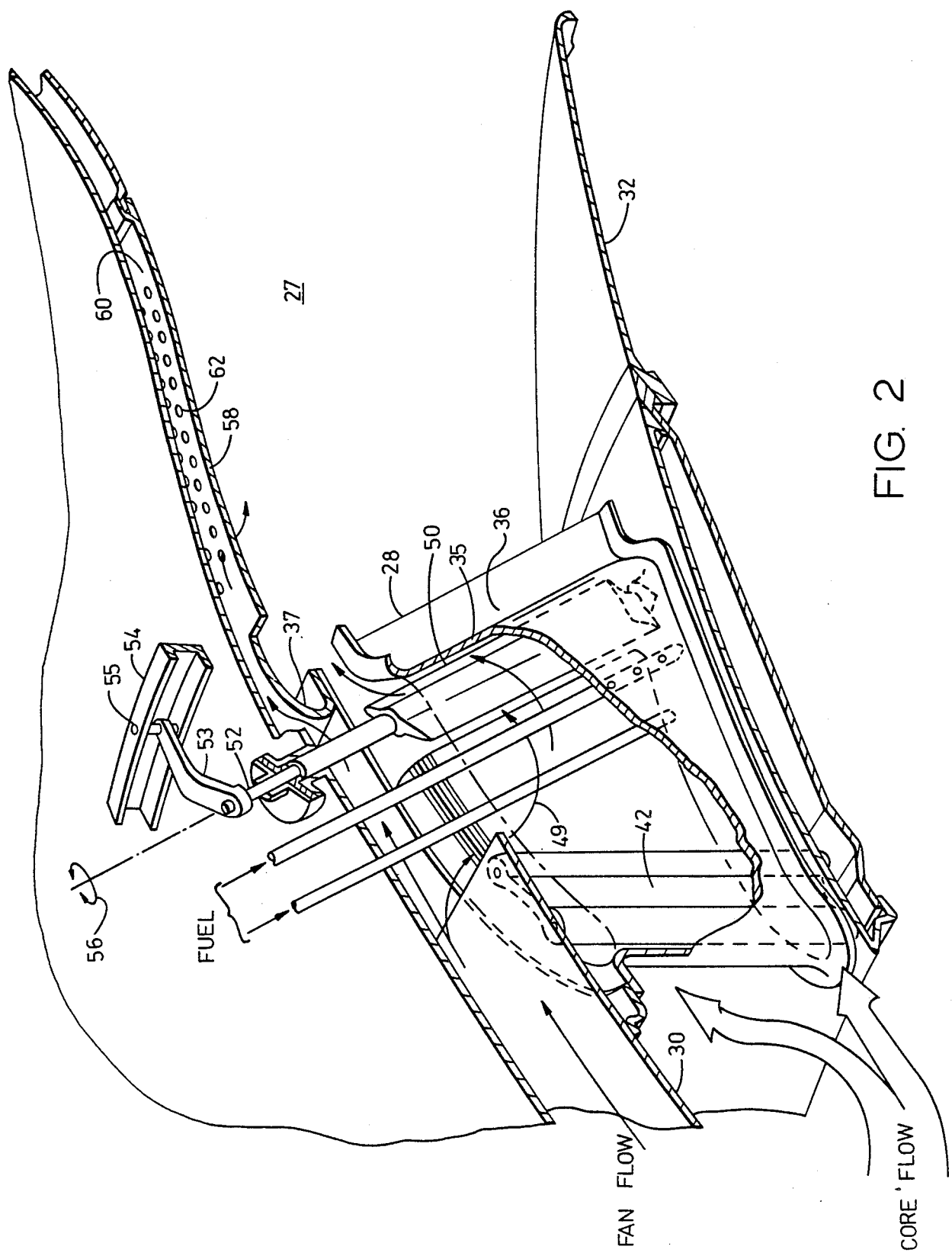
FIG. 2 is an enlarged cut away view of a portion of the gas turbine engine illustrating details of this invention.
Figure 3:
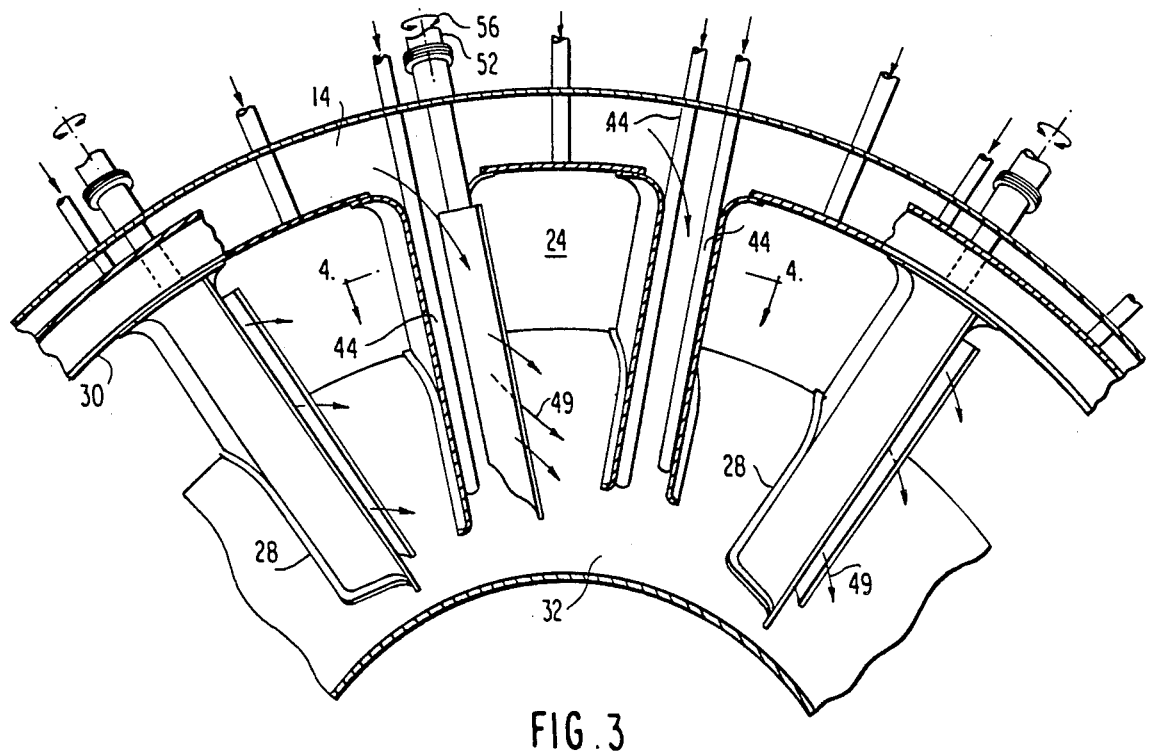
FIG. 3 is a transverse view through components of the structure further illustrating details of this invention.

The apparatus of this invention is located between the bypass duct 14, the core engine exhaust passage and the augmentor 27. Referring now to FIGS. 2 and 3 which illustrate details of the invention, there are shown a plurality of circumferentially displaced hollow members 28. Each of these hollow members 28 extends generally radially between an inner wall 30 of the bypass duct 14 and the center body 32 of the core engine.

Figure 4A:
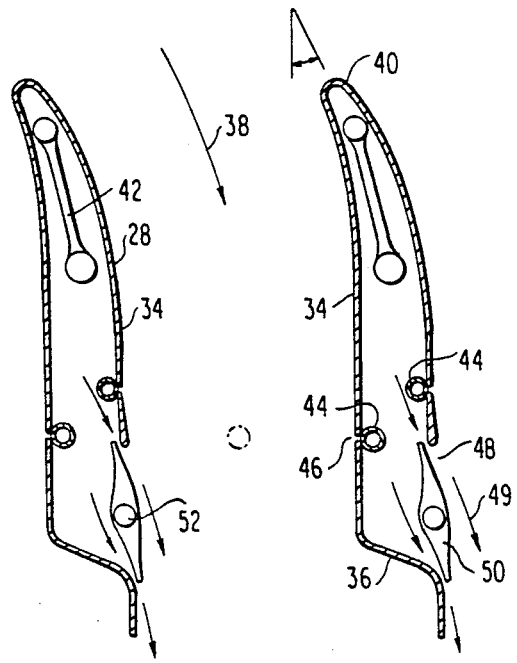
FIG. 4A is a sectional view along the arcuate line 4—4 in FIG. 3 showing control vanes in one position.
Figure 4B:
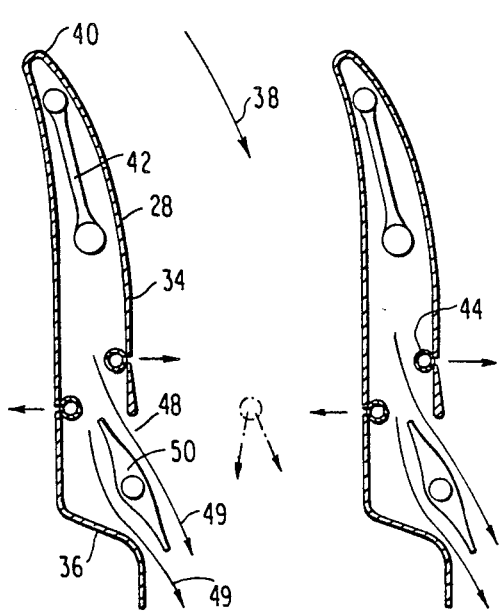
FIG. 4B is a view similar to FIG. 4A, showing the vanes in a second position.

Each of the hollow members is open at its radially outward end for receiving bypass gas from the bypass duct 14 and may be closed at its radially inward end at the center body 32, but some openings may be provided at the radially inward end to provide some flow of air into the center body region. Referring particularly to FIGS. 4A and 4B, each of the hollow members includes spaced sidewalls 34 and an aft wall 35 extending between the sidewalls. The aft wall provides a radially extending flameholder surface 36, as will be explained later in this specification. The forward end 40 of each of the hollow members is curved so as to be directed generally parallel to the flow of the swirling core gases discharged from the turbine of the core engine, this flow direction being indicated by the arrows 38 in FIGS. 4A and 4B. More effective thrust is achieved if the exhaust gas is discharged substantially axially through the exhaust nozzle and the construction of the hollow member with the curved forward end, as above described, effects a deswirling of the discharged core gases so that these gases flow in a substantially axial path aft of the hollow members.

A plurality of radially-extending support structures 42 are provided for supporting the aft end of the core engine. These struts 42 are arranged within the hollow members 28 so as to be cooled by the relatively cool bypass gases passing through the hollow members.

In order to provide fuel for the augmentor a pair of spraybars 44 are provided within each of the hollow members 28. The spraybars 44 extend generally radially and they are fixed to opposite sidewalls 34 of the hollow members in any suitable manner, for example by welding. In order to provide for discharge of the fuel from the spraybars 44 into the core gases for burning within the augmentor, each spraybar 44 includes a plurality of radially displaced openings 46 and aligned openings or a longitudinal slit is provided in the sidewalls 34 of the hollow members for passage of the fuel therethrough.

In order to maintain burning of the fuel discharged into the rapidly moving stream of gases 38, each hollow member 28 is formed at the aft end thereof with a relatively wide, substantially flat surface 36 which serves as a flameholder. Outboard of the radially extending flameholder surface 36 there is provided an additional circumferential flameholding surface 37. The gases flowing past the surface 36 tend to recirculate adjacent the radially extending flameholder surface and thereby to provide a recirculating flow region for maintaining the flame. Thus the shape of the hollow member 28 provides both for deswirling of the core gases discharged from the core engine because of the curved forward end of the hollow member and also provides a flameholder adjacent the radially extending flameholder surface 36 at the aft end of the hollow member. Further, positioning the spraybars within the hollow member 28 so that the relatively cool bypass gas flowing through the hollow member also flows over the spraybars 44, maintains the spraybars at a lower temperature than would otherwise be possible. Thereby decompostion of the fuel is retarded and any plugging of small holes in the fuel system is minimized. The bypass gas also cools the side walls 34 of the hollow members which are subjected to heat from the hot core gases and the radially extending flameholder surface 36 which is subjected to heat from the burning fuel.

In order to provide for discharge of the bypass air for mixing with the core gases flowing along the path 38 each of the hollow members is provided with an opening in one sidewall 34 near the trailing edge thereof, as indicated at 48. This opening 48 extends radially substantially the full radial length of the hollow member so that bypass gas flowing into the hollow member from the bypass duct 14 is discharged into the stream of core gases in a manner effecting thorough mixing of the bypass gas and the core gases. The opening 48, being arranged in the sidewall of the hollow member, as described above, causes the bypass gas to be discharged from the hollow member in a direction indicated by the arrows 49 so that the adjacent streams of bypass gas and core gases are thoroughly mixed by the shear action created at the adjacent gas streams. The large area of the openings 48 in the hollow members increases the shear area. Thus the bypass gases are mixed with the core gases from the core engine over substantially the full radial extent and the full circumferential extent of the flowpath of the core gases, thereby achieving a substantially uniform mixing of the gases.

To accommodate the varying conditions encountered in the range of operation from subsonic speed to supersonic speed and involving both augmented and non-augmented operation, a vane 50 is provided in each hollow member for modulating flow of bypass air through the opening 48. In the specific embodiment illustrated, each vane is mounted on a rod 52 so as to be movable between an open position and a closed or partially closed position. Any suitable means may be provided for engaging the radially outer end of the rods 52 to simultaneously move the rods in the direction of the arrows 56 and thereby to move the vanes to any desired position between the open and closed positions illustrated. For example, as shown in FIG. 2, each of the rods 52 may be connected by a lever arm 53 to a circumferential unison ring 54, which is moved to effect simultaneous movement of the vanes 50. The unison ring is connected to each lever arm 53 by a pin 55. Unison rings for actuating components of gas turbine engines are well known and detailed illustration thereof is not necessary. Any other suitable arrangement for moving the vanes 50 may be employed. Devices for modulating flow of bypass air into the exhaust core gases are known in the art and are generally referred to as variable area bypass injectors. However, in the applicants' arrangement, this variable area bypass injector is conveniently arranged as part of each hollow member 28 and thereby still another feature is incorporated in the single structure provided by the hollow members 28.

To cool the augmentor liner 58 a portion of the bypass gases flowing through the bypass duct 14 is directed through a duct 60 and passes along the outer wall of the liner 58 to provide cooling therefor. Further, the liner 58 includes large number of very small holes, indicated in somewhat exagerated size at 62, through which the bypass gases are directed onto the interior wall of the liner 58 for further cooling thereof.

By the applicants' invention, a plurality of effective functions are incorporated in a single structure, namely, the circumferentially displaced hollow members 28 which extend radially from the inner wall 30 of the bypass duct 14 to the center body 32. Bypass gas is directed from the duct 14 into the open radially outward end of each of the hollow members, and this gas, under control of the vanes 50 flows through the openings 48 in the sidewall of the hollow members for controlled mixing with the core gases being exhausted along the path 38 from the core engine. The bypass gas flows through the radial extent of the hollow members 28, cooling the support members 42 and the spraybars 44, and is then directed along a path indicated by the arrows 49 so that bypass gas stream presents a large shear area to the core gases and the bypass gas and core gases are thoroughly mixed over substantially the entire circumferential and radial extent of the region between adjacent hollow members by the shear action created at the adjacent gas streams. Control vanes 50 are also provided as part of the structure of the hollow members 28 for modulating the flow of bypass gas through the hollow members depending on varying operating conditions. The hollow members 28 are formed at the forward end thereof of curved shape to provide for deswirling of the core gases and are formed at the aft end thereof with a wide flat surface for providing a flameholder or fuel burned in the augmentor. The bypass gas directed into the hollow members cools the sidewalls of the hollow members, the support members and the spraybars, the flameholding surfaces and the center body.

While a specific embodiment of this invention has been illustrated and described, the invention is not limited to the particular structure shown and described, and it is intended to cover by the appended claims all modifications within the spirit and scope of this invention.

We claim:

1. A gas turbine engine including a core engine and a center body associated therewith, an inlet for supplying gas flow to the core engine, a bypass duct surrounding the core engine for bypassing a portion of the gas around the core engine, and an augmentor aft of the core engine, for providing augmented thrust, comprising
   (a) a plurality of circumferentially arranged hollow members positioned in the path of core gases from the core engine;
   (b) each of said members extending generally radially from said bypass duct to said center body;
   (c) each of said members being open at the radially outward end for receiving bypass gas from said bypass duct;
   (d) each of said members including an opening in the side wall thereof near the trailing edge and extending substantially the length of each of said members for discharging bypass gas in a direction which provides thorough mixing of said core gases and said bypass gas throughout substantially the entire region between adjacent hollow members; and
   (e) means disposed in each of said openings for modulating the flow of bypass gas therethrough.

2. A gas turbine engine as recited in claim 1 wherein said means includes a pivoted vane disposed in each of said openings, and means for simultaneously moving said vanes to vary the flow of bypass gas through said members.

3. A gas turbine engine as recited in claim 1 and further including:
   (a) a spraybar disposed in each of said members and including openings therein for discharging fuel for the augmentor from the side of each hollow member into said core gases;
   (b) said spraybars being cooled by bypass gas passing through said hollow members.

4. A gas turbine engine as recited in claim 3 wherein the aft wall of each of said hollow members is formed as a relatively wide surface to provide a flame holder for fuel discharged from said spraybars and burned in the augmentor.

5. A gas turbine engine as recited in claim 3 wherein:
   (a) each of said spraybars is mounted on a side wall of a corresponding one of said hollow members; and
   (b) each of said spraybars has a plurality of radially-spaced openings therein and the side wall of said corresponding one of said hollow members has an opening aligned with said openings in said spraybar for affording passage of fuel from said spraybars to the spaces between said hollow members.

6. A gas turbine engine as recited in claim 5 wherein a sparybar is disposed adjacent each side wall of each of said hollow members for spraying fuel into the spaces at both sides of the corresponding hollow member.

7. A gas turbine engine as recited in claim 1 wherein each of said hollow members is curved at the forward end thereof to a direction corresponding substantially to the angle of discharge of core gases from the core engine to deswirl the core gases.

8. A gas turbine engine as recited in claim 1 wherein:
   (a) the exterior surface of each of the side walls of each of said hollow members is subjected to the heat of core gases flowing thereover;
   (b) the exterior surface of the aft wall of each of said hollow members is formed as a relatively wide surface to provide a flameholder;
   (c) support members for said engine are disposed within said hollow members;
   (d) spray bars for supplying fuel are disposed within said hollow members; and
   (e) said bypass gas flowing through said hollow members cools said side walls and the flameholding surface of said aft wall, said support members and said spraybars.

9. A gas turbine engine including a core engine and a center body associated therewith, an inlet for supplying gas flow to the core engine, a bypass duct surrounding the core engine for bypassing a portion of the gas around the core engine, and an augmentor aft of the core engine, for providing augmented thrust, comprising:
   (a) a plurality of circumferentially disposed hollow members positioned in the path of core gases from the the core engine;
   (b) each of said members extending generally radially from said bypass duct to said center body;
   (c) each of said members being open at the radially outward end for receiving bypass gas from said bypass duct;
   (d) each of said members including spaced apart sidewalls and an opening in one of said side walls near the trailing edge and extending substantially the length of each of said members for discharging bypass gas in a direction which provides thorough mixing of said core gases and said bypass gas throughout substantially the entire region between adjacent hollow members.

10. A gas turbine engine as recited in claim 9 and further including:
(a) a spraybar disposed in each of said members and including openings therein for discharging fuel for the augmentor from the side of each hollow member into said core gases;
(b) said spraybars being cooled by bypass gas passing through said hollow members.

11. A gas turbine engine as recited in claim 10 further comprising: an aft wall extending between said sidewalls of each of said hollow members wherein said aft wall is formed as a relatively wide surface to provide a flame holder for fuel discharged from said spraybars and burned in the augmentor.

12. A gas turbine engine as recited in claim 10 wherein:
(a) each of said spraybars is mounted on a side wall of a corresponding one of said hollow members; and
(b) each of said spraybars has a plurality of radially-spaced openings therein and the side wall of said corresponding one of said hollow members has an opening aligned with said openings in said spraybar for affording passage of fuel from said spraybars to the spaces between said hollow members.

13. A gas turbine engine as recited in claim 12 wherein a spraybar is disposed adjacent each side wall of each of said hollow members for spraying fuel into the spaces at both sides of the corresponding hollow member.

14. A gas turbine engine as recited in claim 9 wherein each of said hollow members is curved at the forward end thereof to a direction corresponding substantially to the angle of discharge of core gases from the core engine to deswirl the core gases.

15. A gas turbine engine as recited in claim 9 wherein:
(a) the exterior surface of each of the side walls of each of said hollow members is subjected to the heat of core gases flowing thereover;
(b) the exterior surface of the aft wall of each of said hollow members is formed as a relatively wide surface to provide a flameholder;
(c) support members for said engine are disposed within said hollow members;
(d) spray bars for supplying fuel are disposed within said hollow members; and
(e) said bypass gas flowing through said hollow member cools said side walls and the flameholding surface of said aft wall, said support members and said spraybars.

* * * * *